(12) United States Patent
Pereira Filho et al.

(10) Patent No.: US 9,275,022 B2
(45) Date of Patent: Mar. 1, 2016

(54) MECHANISM FOR SETTING ASCENT AND BASELINE FOR HTML ELEMENTS

(71) Applicant: Google Inc., Mountain View, CA (US)

(72) Inventors: Luiz Amaral Franca Pereira Filho, Jersey City, NJ (US); Michael Owen Thomas, New York, NY (US); Igor Kopylov, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 394 days.

(21) Appl. No.: 13/955,307

(22) Filed: Jul. 31, 2013

(65) Prior Publication Data
US 2015/0039992 A1    Feb. 5, 2015

(51) Int. Cl.
| | |
|---|---|
| G06F 17/00 | (2006.01) |
| G06F 17/22 | (2006.01) |
| G06F 17/21 | (2006.01) |
| G06F 17/30 | (2006.01) |

(52) U.S. Cl.
CPC .......... G06F 17/2247 (2013.01); G06F 17/211 (2013.01); G06F 17/214 (2013.01); G06F 17/30899 (2013.01)

(58) Field of Classification Search
CPC .............................. G06F 17/211; G06F 17/214
USPC .......................................... 715/200, 269, 244
See application file for complete search history.

(56) References Cited

U.S. PATENT DOCUMENTS

| | | | | |
|---|---|---|---|---|
| RE29,550 E | * | 2/1978 | Bantner | G09G 1/08 315/365 |
| 4,251,799 A | * | 2/1981 | Jih | G06K 9/3283 382/174 |
| 7,071,941 B2 | * | 7/2006 | McCully | G06F 17/214 345/469 |
| 8,484,562 B2 | * | 7/2013 | Schorsch | G06F 17/214 345/629 |
| 2003/0151607 A1 | * | 8/2003 | McCully | G06F 17/214 345/467 |
| 2004/0205606 A1 | * | 10/2004 | McCully | G06F 3/018 715/244 |
| 2005/0286065 A1 | * | 12/2005 | Gauthier | G06F 17/211 358/1.13 |
| 2007/0234203 A1 | * | 10/2007 | Shagam | G06F 17/211 715/210 |

OTHER PUBLICATIONS

Spitz, Determination of the Script and Language Content of Document Images, IEEE 1997, pp. 235-245.*
International Search Report and Written Opinion for Application No. PCT/US2014/048836 dated Dec. 4, 2014, 7 pages.

* cited by examiner

*Primary Examiner* — Cong-Lac Huynh
(74) *Attorney, Agent, or Firm* — Ropes & Gray LLP

(57) ABSTRACT

A method for rendering a document on a web browser includes receiving a portion of text within the document to be rendered on a web browser and determining a maximum height of the portion of text. A spacer element is inserted into the portion of text, where the spacer element has a height greater than the maximum height of the portion of text. A vertical position of the portion of text and the spacer element is adjusted by an offset, where a baseline of the portion of text is determined from the height of the spacer element and the offset. The portion of text is rendered on the web browser based at least in part on the baseline.

31 Claims, 6 Drawing Sheets

The quick brown fox jumps over the lazy dog.
The quick brown fox jumps over the lazy dog.
402 — The quick brown fox jumps over the lazy dog.
The quick brown fox jumps over the lazy dog.
The quick brown fox jumps over the lazy dog.
404 — The quick *brown* fox jumps over the lazy dog.
The quick brown fox jumps over the lazy dog.

MECHANISM FOR SETTING ASCENT AND BASELINE FOR HTML ELEMENTS

BACKGROUND

The Internet and other computer networks allow users to share digital information with each other. One such way to share information is through the use of web pages. Hyper-text markup language (HTML) and cascading style sheets (CSS) are two programming languages commonly used to create web pages and other content accessible over the Internet. These languages have functions to format and arrange content in a variety of ways. A web server delivers HTML and CSS code to a user on a client computer via a web browser. The web browser interprets the HTML and CSS code to compose and display web pages for the user. A wide variety of content may be delivered in this fashion, including text, images, audio, video, and interactive software programs. Cloud computing services are another extension of the delivery of content over the Internet. Cloud computing services store files that users may access from any client computer using a web browser. Any user with access to the file may view, edit, and share the file. Files that may be stored on a cloud computing services include word processing documents, spreadsheets, presentations, images, and many other file types.

Word processing programs installed on a client computer include functionality dedicated to editing and displaying word processing documents. Cloud computing services typically are more limited in their capability for editing and displaying word processing documents on a web browser. HTML and CSS are generalized languages for delivering content over a remote network and are not optimized for the displaying and editing of word processing documents.

One particular problem that arises when displaying cloud-based word processing documents on a web browser is improper rendering of line spacing, which is determined from the baseline of each line of text. HTML automatically calculates the baseline of a line of text based on the font type and font size of the text. If a paragraph of text includes multiple font types and/or multiple font sizes, the relative position of the baseline of each line may vary, and thus the line spacing may vary as well. The result is a visually unappealing block of text.

A similar problem also arises when viewing the same document on different client computers. The hardware, operating system, and web browser of each client computer may affect the display of fonts, so the line spacing for the same cloud-based document may differ between different client computers. There is no way to directly define the baseline in HTML or CSS to prevent uneven line spacing.

SUMMARY

The systems and methods described herein provide a way to implement uniform line spacing when rendering, on a web browser, a document stored on a cloud computing service. A cloud computing service sends a copy of a document to a client computer, where the document is displayed on a web browser executing on the client computer. The cloud computing service also sends a rendering function to aid in the rendering of the document on the client computer display screen. When a portion of text, for example a line of text, is ready for rendering, a maximum height of the portion of text is determined. This height may be measured in pixels. A spacer element is created and inserted into the same in-line section as the portion of text. The spacer element has a height that is greater than the maximum height of the portion of text, and has no width. The HTML will set the height of the portion of text to equal the height of the spacer element because it is the tallest element, with the baseline of text set at the bottom of the spacer element. The vertical position of the portion of text is then adjusted by an offset, which vertically shifts the baseline up from the bottom of the spacer element. The combination of the offset and the height of the spacer element allow the baseline of the portion of the text to be completely customizable, as well as the line spacing. Each portion of text in the document, such as each line of text, may have the same sized spacer element and offset inserted so that the baseline of each line and the line spacing is uniform.

One aspect described herein discloses a method for rendering a document on a web browser. The method includes receiving a portion of text within the document to be rendered on a web browser, determining a maximum height of the portion of text, and inserting into the portion of text a spacer element with a height greater than the maximum height of the portion of text. The method further includes adjusting, by an offset, a vertical position of the portion of text and the spacer element, where a baseline of the portion of text is determined from the height of the spacer element and the offset, and rendering the portion of text on the web browser based at least in part on the baseline.

Another aspect described herein discloses a method for providing a document stored on a cloud computing service to a client computer for rendering. The method includes storing a document on the cloud computing service, and storing a rendering function for rendering the document. The rendering function includes instructions to determine a maximum height of a portion of text in the document, insert into the portion of text a spacer element with a height greater than the maximum height of the portion of text, adjust, by an offset, a vertical position of the portion of text and the spacer element, where a baseline of the portion of text is determined from the height of the spacer element and the offset, and render the portion of text on the web browser based at least in part on the baseline. The method further includes sending the document and the rendering function to a client computer.

Another aspect described herein discloses a system for rendering a document stored on a cloud computing service. The system includes a cloud computing service configured to communicate with a plurality of client computers over a communication network, store a document on the cloud computing service, and store a rendering function for rendering the document. The rendering function comprises instructions to determine a maximum height of a portion of text in the document, insert into the portion of text a spacer element with a height greater than the maximum height of the portion of text, adjust, by an offset, a vertical position of the portion of text and the spacer element, where a baseline of the portion of text is determined from the height of the spacer element and the offset, and render the portion of text on the web browser based at least in part on the baseline. The cloud computing service is further configured to send the document and the rendering function to a first client computer in the plurality of client computers.

BRIEF DESCRIPTION OF THE DRAWINGS

The methods and systems may be better understood from the following illustrative description with reference to the following drawings in which.

DETAILED DESCRIPTION

To provide an overall understanding of the systems and methods described herein, certain illustrative embodiments will now be described. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server, service, or system as used in this description may be a single computing device or multiple computing devices working collectively and in which the storage of data and the execution of functions are spread out among the various computing devices.

Aspects of the systems and methods described herein relate to implementing uniform line spacing when rendering a document stored on a cloud computing service on a web browser. A user at a client computer may access a word processing document stored on a cloud computing service. The cloud computing service sends a copy of a document to the client computer, where the document is displayed on a web browser executing on the client computer. The cloud computing service also sends, among other data, a rendering function for rendering the document on the display screen. When a portion of text, for example a line of text, is to be rendered a maximum height of the portion of text is determined. A spacer element is then created and inserted into the same in-line section as the portion of text. The spacer element has a height that is greater than the maximum height of the portion of text, and has no width. The HTML browser will set the height of the portion of text to equal the height of the spacer element because it is the tallest element, with the baseline of text set at the bottom of the spacer element. The vertical position of the portion of text is then adjusted by an offset, which vertically shifts the baseline. The combination of the offset and the height of the spacer element allows the baseline of the portion of the text to be completely customizable, and thus the line spacing. Each portion of text in the document, such as each line of text, may have a spacer element so that the baseline of each line may be defined and adjusted.

Figure 1:
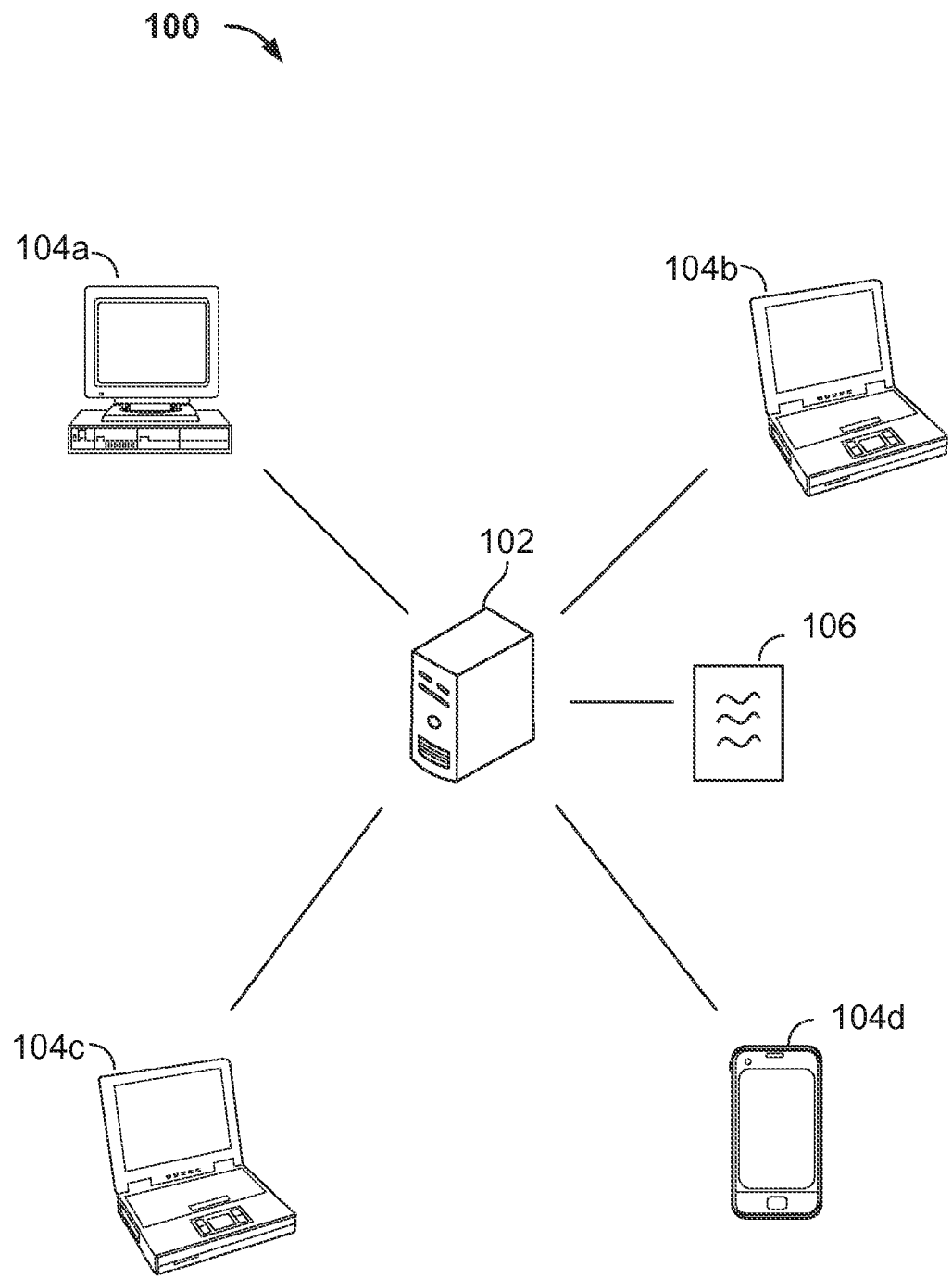
FIG. 1 shows a number of client computers in communication with a cloud computing service in accordance with an implementation as described herein.

First, a network system in which a number of client computers may connect to a cloud computing service is described. FIG. 1 shows a network system 100 that includes cloud computing service 102 and a number of client computers 104a through 104d. Cloud computing service 102 may include one or more servers that collectively provide cloud computing services for a number of client computers. Cloud computing service 102 stores a number of files accessible by client computers 104a-104d, such as file 106. File 106 may be a word processing document, spreadsheet, presentation, image, audio file, video file, or any other file type. Users may create, edit, copy, share, and delete files stored on cloud computing service 102. Client computers 104a-104d may include desktop computers, laptop computers, tablets, smart phones, mobile electronic devices, or any other device that may connect to cloud computing service 102 to view file 106. System 100 may include many additional client computers not pictured in FIG. 1. The network connection between the client computers 104a-104d and cloud computing service 102 in network system 100 may be facilitated through a local area network, wide area network, Ethernet, fiber optic network, or any other wired or wireless connection.

Figure 2:
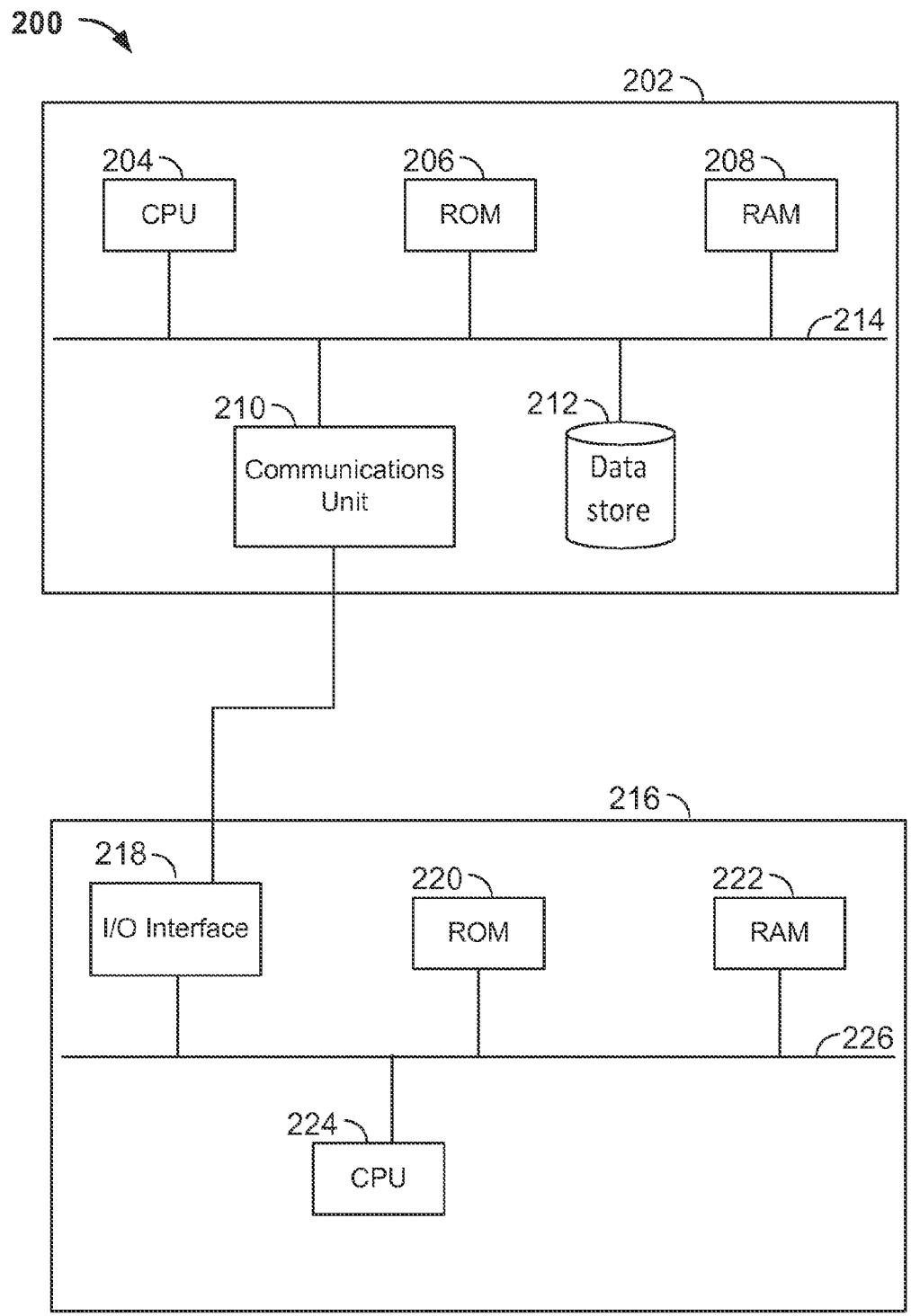
FIG. 2 shows the components of a cloud computing service in communication with a client computer in accordance with an implementation as described herein.

The components of a client computer and a cloud computing service in communication with each other are now described in more detail. System 200 in FIG. 2 includes a cloud computing service 202 in communication with a client computer 216. Cloud computing service 202 includes a central processing unit (CPU) 204, read-only memory (ROM) 206, random access memory (RAM) 208, communications unit 210, data store 212, and bus 214. Cloud computing service 202 may have additional components that are not illustrated in FIG. 2. Bus 214 allows the various components of cloud computing service 202 to communicate with each other. Communications unit 210 allows cloud computing service 202 to communicate with other devices, such as client computer 216 and other client computers. Data store 212 is used to store files accessible by a user on client computer 216. Users log on to the cloud computing service using a username and password, and cloud computing service 202 provides a user interface for the display of files through the web browsers executing on the client computers.

Client computer 216 includes a CPU 224, ROM 220, RAM 222, input/output interface 218, and bus 226. Client computer 216 may have additional components that are not illustrated in FIG. 2. Bus 226 allows the various components of client computer 216 to communicate with each other. Input/output interface 218 allows client computer 216 to communicate with other devices, such as cloud computing service 202. Input/output interface 218 also includes devices for taking in user inputs and displaying outputs to a user, such as a keyboard, mouse, and display screen. CPU 224 executes various programs stored in memory on client computer 216, such as a web browser. Web browsers are used, among other things, to display a user interface provided by cloud computing service 202 for viewing and editing files. Web browsers receive web page documents encoded in HTML, CSS, or other web-compatible languages and interpret the language to properly display the web page.

Data store 212 for files stored on cloud computing service 202, a web browser executing on client computer 216, and other data structures and software programs in system 200 may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and read-only, once-writable, or rewriteable optical disks (such as, e.g., CD-ROM, CD-R, CD+R, CD-RW, CD+RW, DVD-ROM, DVD-R, DVD+R, DVD-RW, and DVD+RW).

Cloud computing services may store word processing documents that a user can view or edit on a web browser executing on the client computer. Word processing documents have certain typographical attributes for text, which are discussed in relation to FIG. 3. Electronic text block 300 shows 2 words, the words "Alphabet" and "Sympathetic" on consecutive lines of text. Each line of text has a baseline 302, which is an imaginary horizontal line upon which text rests, similar to, for example, the horizontal lines found on lined sheets of paper. The distance between the baseline and the top of the highest character glyph on the line of text is the ascent 304. The distance between the baseline and the bottom of the lowest descending character glyph on the line of text (e.g. the 'p' in Alphabet) is the descent 306. The font height 308 is the sum of ascent 304 and descent 306, and may be expressed in pixels or points or other units. Each line of text also has a line height 310 that extends beyond the font size. Line height 310 provides a vertical buffer space between consecutive lines of text. Line height 310 may be adjusted by line spacing, which is a paragraph property that scales the line height by a multiplier, for example single space (×1) or double space (×2). A group of in-line elements is a group of elements, such as a line of text, that share a common baseline, line height, and line spacing. However, these attributes may vary between different groups of in-line elements (i.e. different lines of text).

Figures 3, 4:
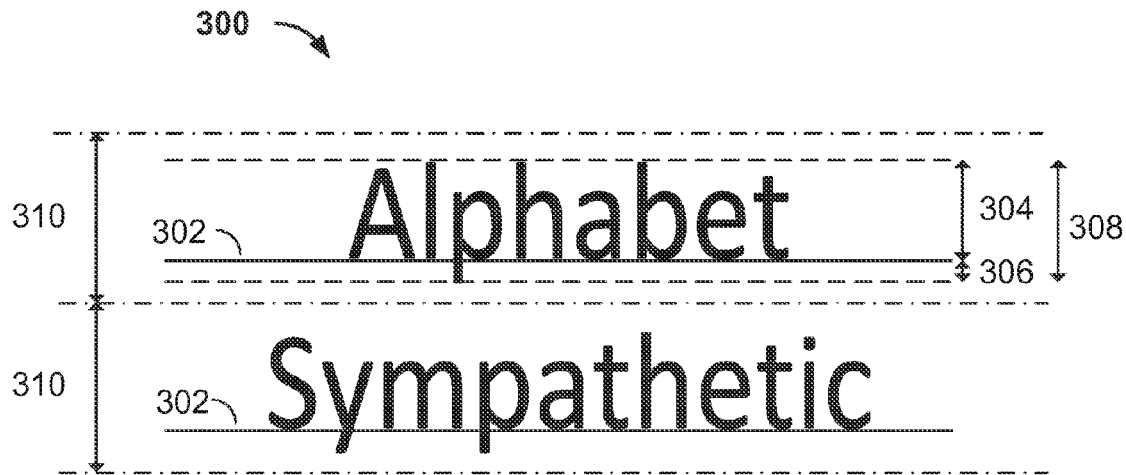
FIG. 3 shows various attributes of electronic typography in accordance with an implementation as described herein.
FIG. 4 shows an example of varying line spacing within a body of text.

When a user accesses a document on a cloud computing service, the cloud computing service sends the document to the client computer for viewing. The document and its formatting instructions are encoded in HTML and CSS so that the web browser may interpret and display the document. The document may be presented in rich text format for the user to edit. The cloud computing service may also send additional code to the web browser to control the layout and rendering of the document. The document may have one or more blocks of text, where each line of text is a group of in-line elements that share a common baseline. HTML and CSS do not have functionality to directly set the baseline of each line of text. Rather, the HTML algorithm surveys the ascents and descents of every type and size of text on a line of text. The largest ascent value and the largest descent value are set as the ascent and descent of the entire line. The baseline of the line of text is set at a distance below the top margin, where the distance equals the ascent. Thus consecutive lines of text may have different baselines and line spacing. FIG. 4 shows an example of this situation. The text in text block 400 is mostly uniform, except that in line 402 the word "jumps" is a larger font size than the surrounding text and in line 404 the word "brown" is a different font type than the surrounding text. In both cases, changing the font size or font type changes the baseline and line spacing above and below lines 402 and 404. There is no method to directly set the baseline in each line of text, so this results in text block 400 having uneven line spacing. The margins and padding of the text may be manually adjusted, but this requires a lot of experimentation. In addition, each client computer may have different settings for rendering text. The rendering settings may be affected by the hardware, the operating system on each client computer, or the web browser executing on each client computer. Thus the same text may have different line spacing on each client computer.

Figure 5:
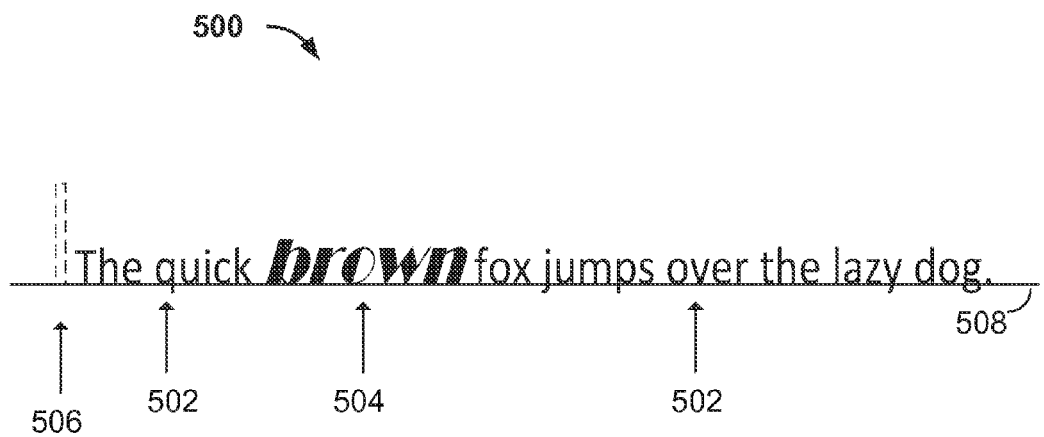
FIG. 5 shows a spacer element inserted into a portion of text for controlling the placement of the baseline of text in accordance with an implementation as described herein.

To fully control the placement of the baseline of in-line text and therefore the line spacing of each line of text for a document provided by a cloud computing service, a spacer element is inserted into each line of text. This spacer element is not displayed on screen but is defined to be larger than any other text within the block of text. The HTML layout algorithm will set the ascent of the line of text equal to the largest ascent of all elements found within the line. The height of the spacer element, being the tallest element in the line, will be set as the ascent of the line. Thus the baseline and line spacing of each line in the block of text is dictated by the size of the spacer element. FIG. 5 shows an example of how the spacer element works. In-line element group 500 is a group of in-line elements that include portions of text 502 that have the same font type and size, another portion of text 504 that has a different font style and size, and spacer element 506. Spacer element 506 is represented by a dashed rectangle. Spacer element 506 is defined with a vertical height greater than any of the surrounding in-line elements. The height may be defined in pixels, points, or other units. For example, if the largest font size in in-line element group 500 is 30 pixels, the vertical height of spacer element 506 may be defined to be 50 pixels or any other value above 30 pixels. The vertical height of spacer element 506 may be defined as a multiple of the maximum height of in-line element group 500 to ensure that spacer element 506 is taller than all other elements. The vertical height of spacer element 506 may also be a multiple of the largest font size or style in in-line element group 500 if the maximum height cannot be exactly determined. The width of spacer element 506 is set to zero so that it does not take up any horizontal space on the line. The vertical alignment of spacer element 506 is set to baseline 508, and thus the ascent of the in-line element group 500 is set to the vertical height of spacer element.

To alter the ascent of in-line element group 500 and therefore the placement of baseline 508, a vertical offset is applied to shift the vertical position of all elements in in-line element group 500. The vertical position of in-line element group 500 may be changed by changing the "margin-top," "top," or "transform" properties for in-line element group 500. For example, if the vertical height of spacer element 506 is 100 pixels and the top margin of in-line element group 500 is shifted −40 pixels, the result is that all elements in in-line element group 500 are effectively shifted 40 pixels up within in-line element group. While line height is still 100 pixels, the baseline is now 40 pixels above the bottom margin of in-line element group 500. By varying the vertical height of spacer element 506 and the vertical placement of in-line element group 500, the baseline 508 and the line spacing may be exactly specified for each group of in-line elements.

The cloud computing service that provides the document to the client computer also provides a rendering function to render the text with the spacer elements in place. For example, the cloud computing service may provide a layout engine to the web browser that controls the layout of the document, e.g. the placement of each line of text and where line breaks occur. The layout engine may be created using JavaScript or another scripting language. The layout engine may include a rendering function that renders and re-renders the document on the client computer web browser. Every time a group of in-line elements is rendered, the rendering function inserts a spacer element into each in-line group of elements and applies an offset. The spacer elements each have the same size and the same offset is applied to each in-line group, resulting in uniform line spacing. For example, the rendering function may adjust the HTML code of a group of in-line elements before rendering by adding a spacer element and an offset:

```
<div style="margin-top:-40px";>
    <div style="display:inline-block; height: 100px;
vertical-align:baseline; width: 0;"></div>
        <span style="font-size: 10px; font-family:
Arial;">some text</span>
        <span style="font-size: 10px; font-family: Courier
New;">more text</span></div>
```

The first "div style" function sets an offset of the top margin of the group of in-line elements to −40 pixels, which shifts the entire group of in-line elements up 40 pixels. A spacer element is inserted using the "div style" function, where the spacer element has a height of 100 pixels, is aligned with the baseline, and has a width of 0 pixels. The group of in-line elements includes two portions of text, both with font size of 10 pixels but one with Arial font style and the other with Courier New font style. When the HTML algorithm compiles the above code, it determines the greatest ascent among the in-line elements. The spacer element has the greatest ascent and therefore the HTML will set the ascent of the line to be the vertical height of the spacer element, 100 pixels, and the baseline at the bottom of the spacer element. The whole line is then shifted upwards by 40 pixels by offsetting the top margin of the group of in-line elements, thus setting the ascent at 60 pixels, the descent at 40 pixels, and the baseline at 40 pixels above the bottom of the spacer element. The offset and vertical height of the spacer element may be varied to vary the baseline and line height to achieve uniform line spacing between lines.

Figure 6:
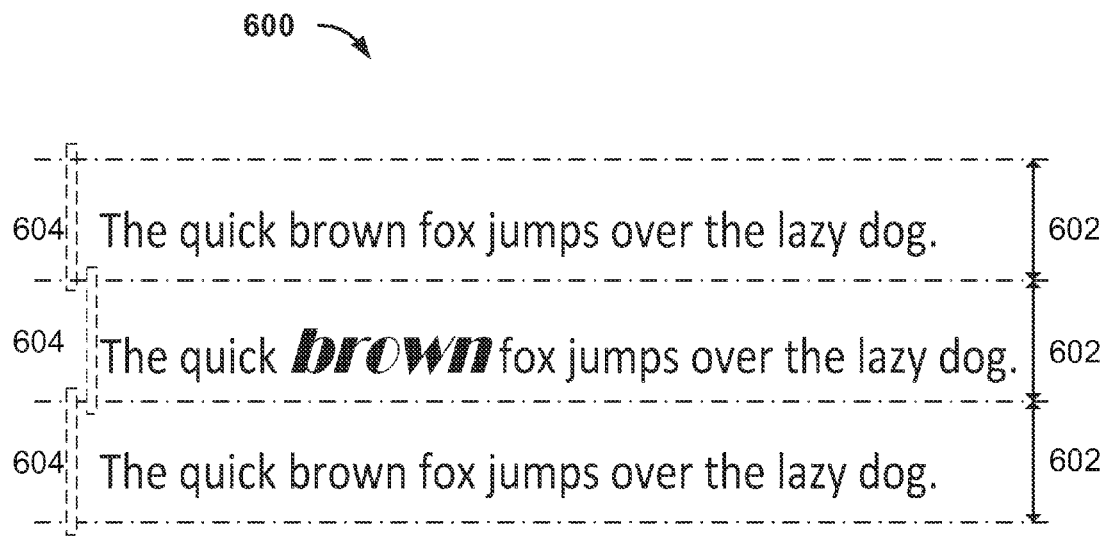
FIG. 6 shows multiple lines of text, each with a spacer element for controlling the placement of the baseline in accordance with an implementation as described herein.

The rendering code inserts the spacer element into each group of in-line elements, such as each line of text in a block of text. This results in uniform line spacing in a block of text regardless of varying font styles and sizes, and maintains uniformity across different client computers. An example is shown in FIG. 6. Text block 600 has three lines of text, where the font size and style varies on the second line. Spacer elements 604 are inserted into each line of text, where the spacer elements have a greater vertical height than any other elements in the line. Spacer elements 604 each have the same vertical height, and each line is vertically offset by the same amount. Because spacer elements 604 are used to place the baseline of each line of text within the vertical space defined by the spacer elements, they do not directly affect the line spacing, which is determined separately. Therefore, the height of spacer elements 604 may actually be greater than the line spacing, as shown in FIG. 6, but it is of no consequence because the spacer elements 604 are not visible on the display screen. This allows full control and uniformity over the baseline and line height 602, and so allows control over the line spacing of each line in text block 600. Thus unlike the line spacing in FIG. 4, the line spacing in FIG. 6 is uniform because of the use of spacer elements 604. Even in the absence of varying font sizes or styles, spacer elements may be used to keep a uniform appearance of a document across different client computers by being able to exactly control the baseline and line height of each line to achieve uniform line spacing.

Figure 7:
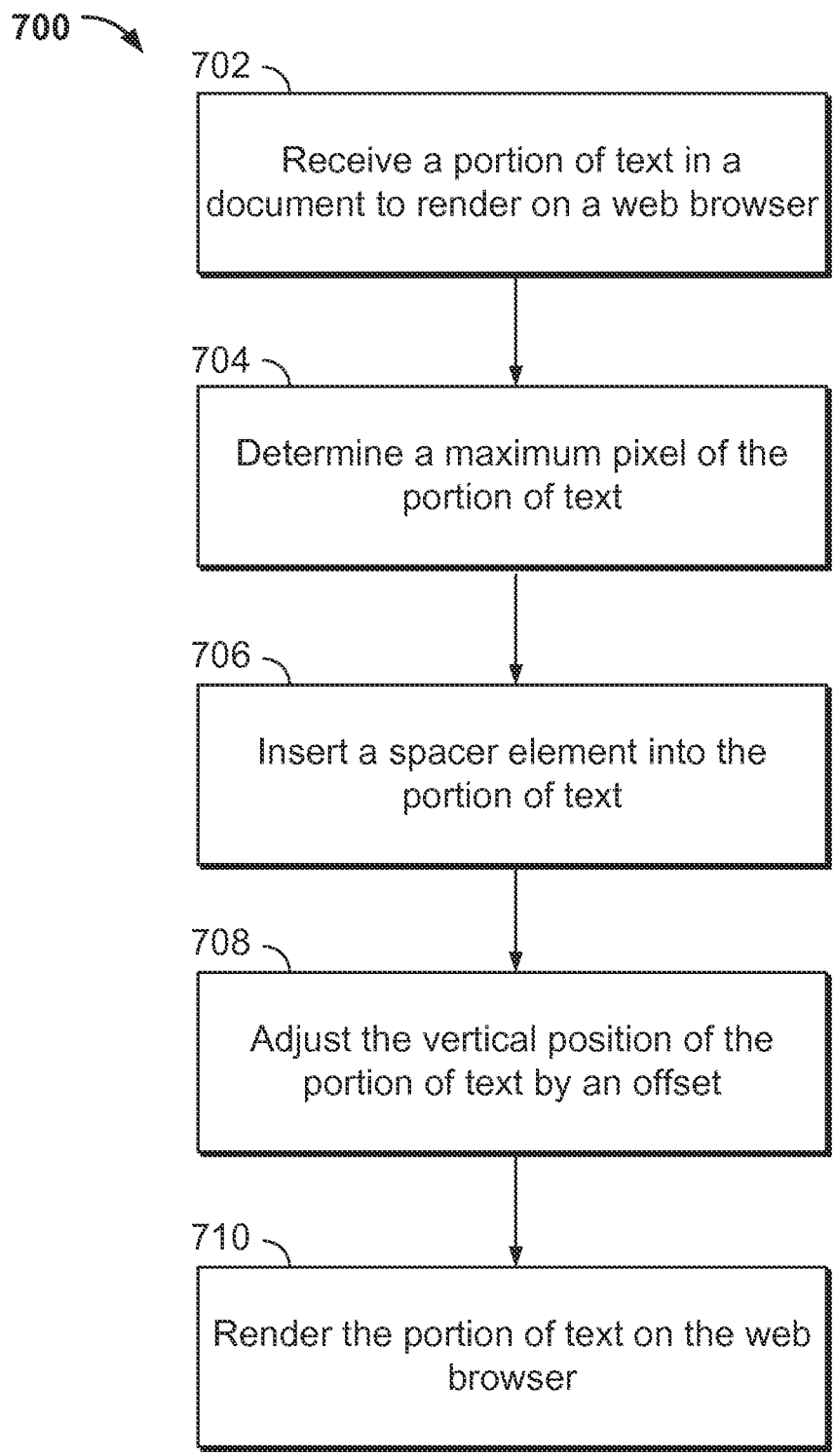
FIG. 7 shows a method for rendering a document on a web browser in accordance with an implementation as described herein.

Methods performed on a client computer for rendering documents on a web browser utilizing the spacer element are now described. FIG. 7 illustrates a method 700 for rendering a document on a web browser, the method including receiving a portion of text within the document to be rendered on a web browser, determining a maximum height of the portion of text, and inserting into the portion of text a spacer element with a height greater than the maximum height of the portion of text. The method further includes adjusting, by an offset, a vertical position of the portion of text and the spacer element, where a baseline of the portion of text is determined from the height of the spacer element and the offset, and rendering the portion of text on the web browser based at least in part on the baseline. Method 700 may be performed on any client computer that may connect to a cloud computing service, such as client computers 104a-104d in FIG. 1 and client computer 216 in FIG. 2.

Method 700 begins when a client computer receives a portion of text within a document to be rendered on a web browser, illustrated at 702. The document is stored on a cloud computing service and is displayed to a user on the client computer through a web browser executing on the client computer. The cloud computing service provides a rendering function to the client computer that controls the rendering of text on the web browser and performs method 700. The document may be a word processing document. The portion of text is a group of in-line elements, for example a single line of text in the document. The portion of text may include one or more font types and one or more font sizes. The client computer may be rendering each line of text for display on the web browser. The document may be encoded in HTML and/or CSS. A maximum height for the portion of text is determined, shown at 704. The maximum height may be determined from taking the maximum value of all the ascents and descents of the various font sizes and styles in the portion of text. The maximum height may be measured in pixels, points, or other units.

After the maximum height of the portion of text is determined, a spacer element is created and inserted within the portion of text, shown at 706. The spacer element has a height greater than the maximum height of the portion of text. For example, the height of the spacer element may be defined as a multiple of the maximum height of the portion of text to ensure that the spacer element is taller than all other elements. The spacer element has a width of zero so that it does not take up horizontal line space. The bottom of the spacer element is aligned with the baseline of the portion of text. When the spacer element is included with the portion of text, the ascent of the portion of the text becomes the height of the spacer element because it is taller than all other elements in the portion of text. After the spacer element has been created, the vertical position of the portion of text, including the spacer element, is adjusted by an offset, illustrated at 708. The offset adjusts the position of the baseline for the portion of the text. For example, the vertical margin of the portion of text may be shifted upward by a specified amount (e.g. a negative pixel value). The CSS "top" and "transform" properties of the portion of text may also be used to adjust its vertical position. Together the height of the spacer element and the offset define the position of the baseline for the portion of text and the line height, and thus the line spacing of the portion of text may be controlled and made uniform. Lastly, the portion of text is rendered on the web browser, shown at 710. The baseline determines the location on the web browser window that the portion of text is rendered. The baseline of each line of text in the document may be set in this way, so the line spacing of the entire document may be completely specified. In this manner, method 700 provides a way to for a client computer to control the baseline and line spacing of text when rendering a document on a web browser.

Figure 8:
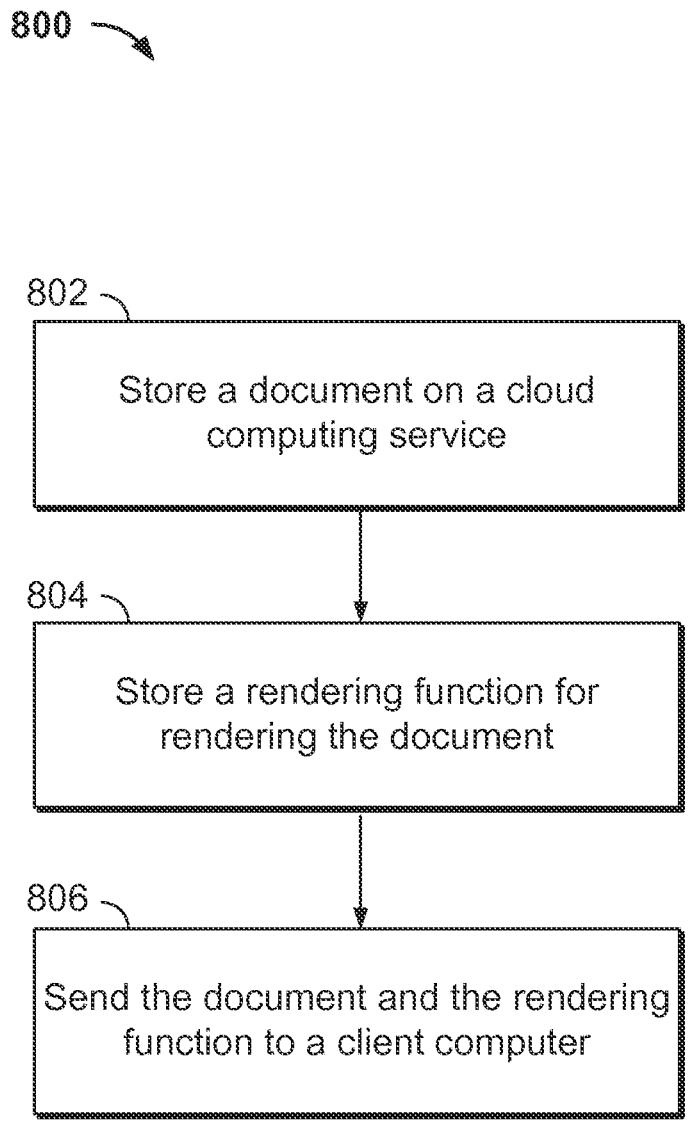
FIG. 8 shows a method for providing uniform line space rendering of a document stored on a cloud computing service in accordance with an implementation as described herein.

The cloud computing service providing the document to the client computer also provides functionality for rendering the document on a web browser. The cloud computing service sends a rendering or layout engine to the web browser, which controls how the document is rendered and may be used to control the placement of the baseline of text. FIG. 8 illustrates a method 800 for providing a document stored on a cloud computing service to a client computer for rendering. Method 800 includes storing a document on the cloud computing service, and storing a rendering function for rendering the document. The rendering function includes instructions to determine a maximum height of a portion of text in the document, insert into the portion of text a spacer element with a height greater than the maximum height of the portion of text, adjust, by an offset, a vertical position of the portion of text and the spacer element, where a baseline of the portion of text is determined from the height of the spacer element and the offset, and render the portion of text on the web browser based at least in part on the baseline. The method further includes sending the document and the rendering function to a client computer. Method 800 may be performed on a cloud computing service such as the ones illustrated in FIGS. 1 and 2.

Method 800 begins when a cloud computing service stores a document, illustrated at 802. The document may be a word processing document. A user on a client computer saves or creates the document on a cloud computing service and is thereafter able to access the document through a web browser executing on the client computer. The cloud computing service also stores a rendering function for rendering the document, illustrated at 804. The rendering function controls how the web browser renders the document by adjusting the HTML and/or CSS code of the document. The rendering function may accomplish "on-the-fly" rendering—that is, any edits a user makes to the document may be rendered and displayed immediately by the rendering function. The rendering function may be implemented as instructions in JavaScript or another scripting language, and may be part of a larger rendering or layout engine that determines the layout of the document on the web browser.

The rendering function has the ability to adjust the baseline and line spacing of a portion of text in the document. The portion of text is a group of in-line elements, for example a single line of text in the document. The portion of text may include one or more font types and one or more font sizes. The client computer may be rendering each line of text for display on the web browser. The rendering function determines a maximum height for the portion of text. The maximum height may be determined from taking the maximum value of all the ascents and descents of the various font sizes and styles in the portion of text. The maximum height may be measured in pixels, points, or other units.

After the maximum height of the portion of text is determined, the rendering function creates a spacer element and inserts it within the portion of text. The spacer element has a height greater than the maximum height of the portion of text. For example, the height of the spacer element may be defined as a multiple of the maximum height of the portion of text to ensure that the spacer element is taller than all other elements. The spacer element has a width of zero so that it does not take up horizontal line space. The bottom of the spacer element is aligned with the baseline of the portion of text. When the spacer element is included with the portion of text, the ascent of the portion of the text becomes the height of the spacer element because it is taller than all other elements in the portion of text. After the spacer element has been created, the rendering function adjusts the vertical position of the portion of text, including the spacer element, by an offset. The offset adjusts the position of the baseline for the portion of the text. For example, the vertical margin of the portion of text may be shifted upward by a specified amount (e.g. a negative pixel value). The CSS "top" and "transform" properties of the portion of text may also be used to adjust its vertical position. Together the height of the spacer element and the offset define the position of the baseline and line height for the portion of text, and thus the line spacing of the portion of text may be controlled and made uniform. Lastly, the rendering function renders the portion of text on the web browser. The baseline determines the location on the web browser window that the portion of text is rendered. The baseline of each line of text in the document may be set in this way, so the line spacing of the entire document may be completely specified.

After the cloud computing service stores both the document and the rendering function, the cloud computing service sends the document and the rendering function to a client computer, illustrated at 806. This may be in response to a user on the client computer accessing the cloud computing service and requesting a copy of a document stored on the cloud computing service. The user uses a web browser executing on the client computer to access and display the document. The cloud computing service sends a copy of the document, encoded in HTML and/or CSS, to the client computer, where it is interpreted and displayed by the web browser. The rendering function is also sent and instructs the web browser how to render the document. In this manner, method 800 provides a way for a cloud computing service to control the baseline and line spacing of text when a cloud-based document is rendered on a client computer.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for rendering a document on a web browser, the method comprising:
   receiving a portion of text within the document to be rendered on a web browser;
   determining a maximum height of the portion of text;
   inserting into the portion of text a spacer element with a height greater than the maximum height of the portion of text;
   adjusting, by an offset, a vertical position of the portion of text and the spacer element, wherein a baseline of the portion of text is determined from the height of the spacer element and the offset; and
   rendering the portion of text on the web browser based at least in part on the baseline.

2. The method of claim 1, wherein the portion of text is a single line of text.

3. The method of claim 1, wherein the portion of text includes one or more font types.

4. The method of claim 1, wherein the portion of text includes one or more font sizes.

5. The method of claim 1, wherein the spacer element has a width of zero.

6. The method of claim 1, wherein the height of the spacer element is a multiple of the maximum height of the portion of text.

7. The method of claim 1, wherein the vertical position of the portion of text and the spacer element is defined by a top margin.

8. The method of claim 7, wherein the offset is a negative value applied to the top margin.

9. The method of claim 1, wherein the document is stored on a cloud computing service.

10. The method of claim 1, wherein the document is a word processing document.

11. A method for providing a document stored on a cloud computing service to a client computer for rendering, the method comprising:
- storing a document on the cloud computing service;
- storing a rendering function for rendering the document, wherein the rendering function comprises instructions to:
  - determine a maximum height of a portion of text in the document;
  - insert into the portion of text a spacer element with a height greater than the maximum height of the portion of text;
  - adjust, by an offset, a vertical position of the portion of text and the spacer element, wherein a baseline of the portion of text is determined from the height of the spacer element and the offset; and
  - render the portion of text on the web browser based at least in part on the baseline; and
- sending the document and the rendering function to a client computer.

12. The method of claim 11, wherein the portion of text is a single line of text.

13. The method of claim 11, wherein the portion of text includes one or more font types.

14. The method of claim 11, wherein the portion of text includes one or more font sizes.

15. The method of claim 11, wherein the spacer element has a width of zero.

16. The method of claim 11, wherein the height of the spacer element is a multiple of the maximum height of the portion of text.

17. The method of claim 11, wherein the vertical position of the portion of text and the spacer element is defined by a top margin.

18. The method of claim 17, wherein the offset is a negative value applied to the top margin.

19. The method of claim 11, wherein the document is a word processing document.

20. The method of claim 11, wherein the rendering function is implemented in JavaScript.

21. The method of claim 11, wherein the document comprises a plurality of portions of text, and each portion of text is rendered using the rendering function.

22. A system for rendering a document stored on a cloud computing service, the system comprising:
- a cloud computing service, wherein the cloud computing service is configured to:
  - communicate with a plurality of client computers over a communication network;
  - store a document on the cloud computing service;
  - store a rendering function for rendering the document, wherein the rendering function comprises instructions to:
    - determine a maximum height of a portion of text in the document;
    - insert into the portion of text a spacer element with a height greater than the maximum height of the portion of text;
    - adjust, by an offset, a vertical position of the portion of text and the spacer element, wherein a baseline of the portion of text is determined from the height of the spacer element and the offset; and
    - render the portion of text on the web browser based at least in part on the baseline; and
  - send the document and the rendering function to a first client computer in the plurality of client computers.

23. The system of claim 22, wherein the portion of text is a single line of text.

24. The system of claim 22, wherein the portion of text includes one or more font types.

25. The system of claim 22, wherein the portion of text includes one or more font sizes.

26. The system of claim 22, wherein the spacer element has a width of zero.

27. The system of claim 22, wherein the vertical position of the portion of text and the spacer element is defined by a top margin.

28. The system of claim 27, wherein the offset is a negative value applied to the top margin.

29. The system of claim 22, wherein the document is a word processing document.

30. The system of claim 22, wherein the rendering function is implemented in JavaScript.

31. The system of claim 22, wherein the document comprises a plurality of portions of text, and each portion of text is rendered using the rendering function.

* * * * *